US008359651B1

(12) United States Patent
Wu et al.

(10) Patent No.: US 8,359,651 B1
(45) Date of Patent: Jan. 22, 2013

(54) DISCOVERING MALICIOUS LOCATIONS IN A PUBLIC COMPUTER NETWORK

(75) Inventors: Handong Wu, Los Angeles, CA (US); Alendry Ivan Macalintal, Temple City, CA (US); Andrew Kyle Purtell, Northridge, CA (US); Andrew Lee, Atlanta, GA (US); Chenghuai Lu, Sunnyvale, CA (US); Feike Hayo Hacquebord, Cupertino, CA (US); Yi-Fen Chen, Pasadena, CA (US); Raimund Alexander Genes, Jetzendorf (DE)

(73) Assignee: Trend Micro Incorporated, Tokyo (JP)

( * ) Notice: Subject to any disclaimer, the term of this patent is extended or adjusted under 35 U.S.C. 154(b) by 1257 days.

(21) Appl. No.: 12/121,014

(22) Filed: May 15, 2008

(51) Int. Cl.
  *G06F 11/00* (2006.01)
  *G06F 12/14* (2006.01)
(52) U.S. Cl. ............. 726/25; 726/22; 726/23; 726/24; 713/182; 709/224; 709/225; 707/999
(58) Field of Classification Search .............. 726/23–25; 713/166, 182; 709/223–225; 715/738
See application file for complete search history.

(56) References Cited

U.S. PATENT DOCUMENTS

| | | | | |
|---|---|---|---|---|
| 6,427,020 | B1 * | 7/2002 | Rhoads | 382/100 |
| 7,543,055 | B2 * | 6/2009 | Kohn | 709/224 |
| 7,685,296 | B2 * | 3/2010 | Brill et al. | 709/228 |
| 7,765,481 | B2 * | 7/2010 | Dixon et al. | 715/738 |
| 8,020,206 | B2 * | 9/2011 | Hubbard et al. | 726/22 |
| 8,136,029 | B2 * | 3/2012 | Jagdale et al. | 715/206 |
| 2006/0075494 | A1 * | 4/2006 | Bertman et al. | 726/22 |
| 2006/0253458 | A1 | 11/2006 | Dixon et al. | |
| 2006/0253578 | A1 | 11/2006 | Dixon et al. | |
| 2006/0253579 | A1 | 11/2006 | Dixon et al. | |
| 2006/0253580 | A1 | 11/2006 | Dixon et al. | |
| 2006/0253581 | A1 | 11/2006 | Dixon et al. | |
| 2006/0253582 | A1 | 11/2006 | Dixon et al. | |
| 2006/0253583 | A1 | 11/2006 | Dixon et al. | |
| 2006/0253584 | A1 | 11/2006 | Dixon et al. | |
| 2007/0174915 | A1 * | 7/2007 | Gribble et al. | 726/24 |
| 2007/0208940 | A1 * | 9/2007 | Adelman et al. | 713/168 |
| 2007/0209080 | A1 * | 9/2007 | Ture et al. | 726/28 |
| 2007/0283425 | A1 * | 12/2007 | Ture et al. | 726/5 |
| 2008/0010683 | A1 * | 1/2008 | Baddour et al. | 726/24 |
| 2008/0021904 | A1 * | 1/2008 | Garg et al. | 707/10 |
| 2008/0082662 | A1 * | 4/2008 | Dandliker et al. | 709/225 |
| 2008/0208868 | A1 * | 8/2008 | Hubbard | 707/10 |
| 2009/0287641 | A1 * | 11/2009 | Rahm | 707/3 |

OTHER PUBLICATIONS

Xiaoyan Sun, Collecting Internet Malware Based on Client-Side Honeypot, Nov. 2008, IEEE, vol. 9, pp. 3-5.*
Server Authority—Infrastructure for Anti-Spam, 1 sheet, Server Authority [webpage] [online], [retrieve on Feb. 11, 2008]. Retrieved from the internet: http://www.serverauthority.net/.
Threat Management: Web Threats, a Trend Micro White Paper, Feb. 2007, 14 sheets, [retrieved on Feb. 11, 2008]. Retrieved from the internet: http://us.trendmicro.com/us/threats/enterprise/web-threats/.

* cited by examiner

*Primary Examiner* — Nathan Flynn
*Assistant Examiner* — Viral Lakhia
(74) *Attorney, Agent, or Firm* — Okamoto & Benedicto LLP

(57) ABSTRACT

A web threat protection system may receive candidate uniform resource locators (URLs) from several URL sources. The candidate URLs may be received in a submission database. At least a portion of the candidate URLs is selected for further investigation by sending crawlers to retrieve objects from the selected URLs. The retrieved objects may be analyzed to determine whether they are malicious or good (i.e., not malicious). The result of the analysis may be used to build a security states database that includes security information of the selected URLs. Good URLs may be included in a safe URL sphere, which may be used to navigate to good websites on the Internet.

6 Claims, 5 Drawing Sheets

DISCOVERING MALICIOUS LOCATIONS IN A PUBLIC COMPUTER NETWORK

BACKGROUND OF THE INVENTION

1. Field of the Invention

The present invention relates generally to computer security, and more particularly but not exclusively to methods and apparatus for discovering malicious locations in a public computer network, such as the Internet.

2. Description of the Background Art

As is well known, the Internet is an example of a public computer network accessible to almost anyone with a computer running a web browser. The Internet allows access to a wide variety of information from all over the world, twenty four hours a day. Although most locations on the Internet are probably safe, it is well documented that the Internet is home to all sorts of malicious locations. These malicious locations are in the form of websites or web servers configured to receive stolen confidential information (e.g., credit card information, passwords to online accounts, etc.), surreptitiously download malicious code (e.g., viruses) to visiting computers, and mimic legitimate websites to trick visitors into entering confidential information. One way of protecting against these "Web threats" is to compile and maintain a listing of addresses of known malicious locations on the Internet. The listing may be used to detect when an Internet user is navigating to a malicious website, and to block access to the malicious website or at least so inform the user. Embodiments of the present invention pertain to methods and apparatus for discovering malicious locations, such as uniform resource locators (URL) of malicious websites on the Internet, in a timely and effective manner.

SUMMARY

A web threat protection system may receive candidate uniform resource locators (URLs) from several URL sources. The candidate URLs may be received in a submission database. At least a portion of the candidate URLs is selected for further investigation by sending crawlers to retrieve objects from the selected URLs. The retrieved objects may be analyzed to determine whether they are malicious or good (i.e., not malicious). The result of the analysis may be used to build a security states database that includes security information of the selected URLs. Good URLs may be included in a safe URL sphere, which may be used to navigate to good websites on the Internet.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Computer viruses, worms, Trojans, rootkits, botnets, and spyware are examples of malicious codes that have plagued computer systems throughout the world. Although there are technical differences between each type of malicious code, malicious codes are collectively referred to herein as "viruses." For example, commercially available "antivirus software" is designed to scan a computer for viruses as well as worms and other malicious codes.

Figure 1:
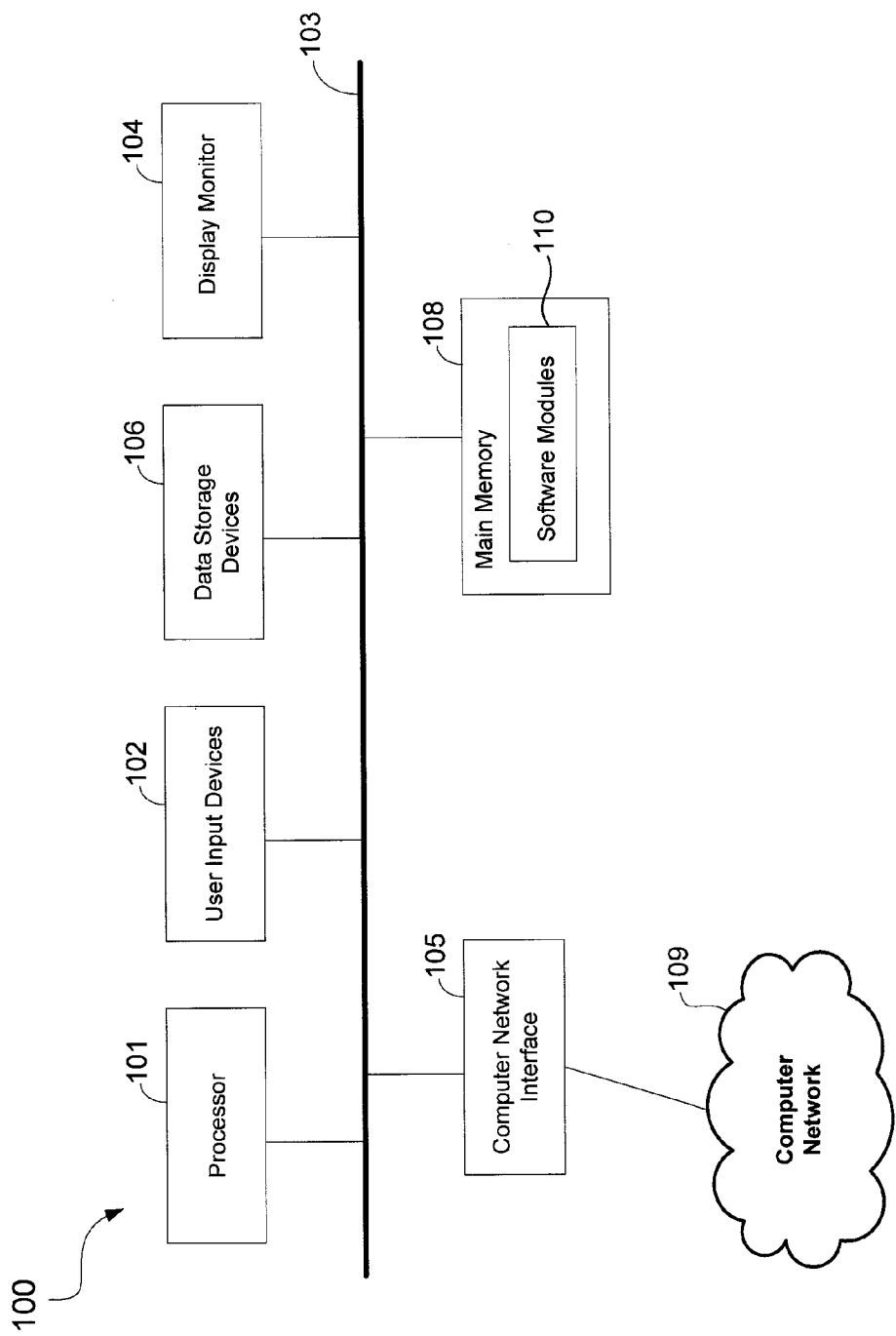
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed in one or more operations of a web threat processing backbone system 200 (FIG. 2), for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes software modules 110. The software modules 110 may be loaded from the data storage device 106 to the main memory 108 for execution by the processor 101.

Figure 2:
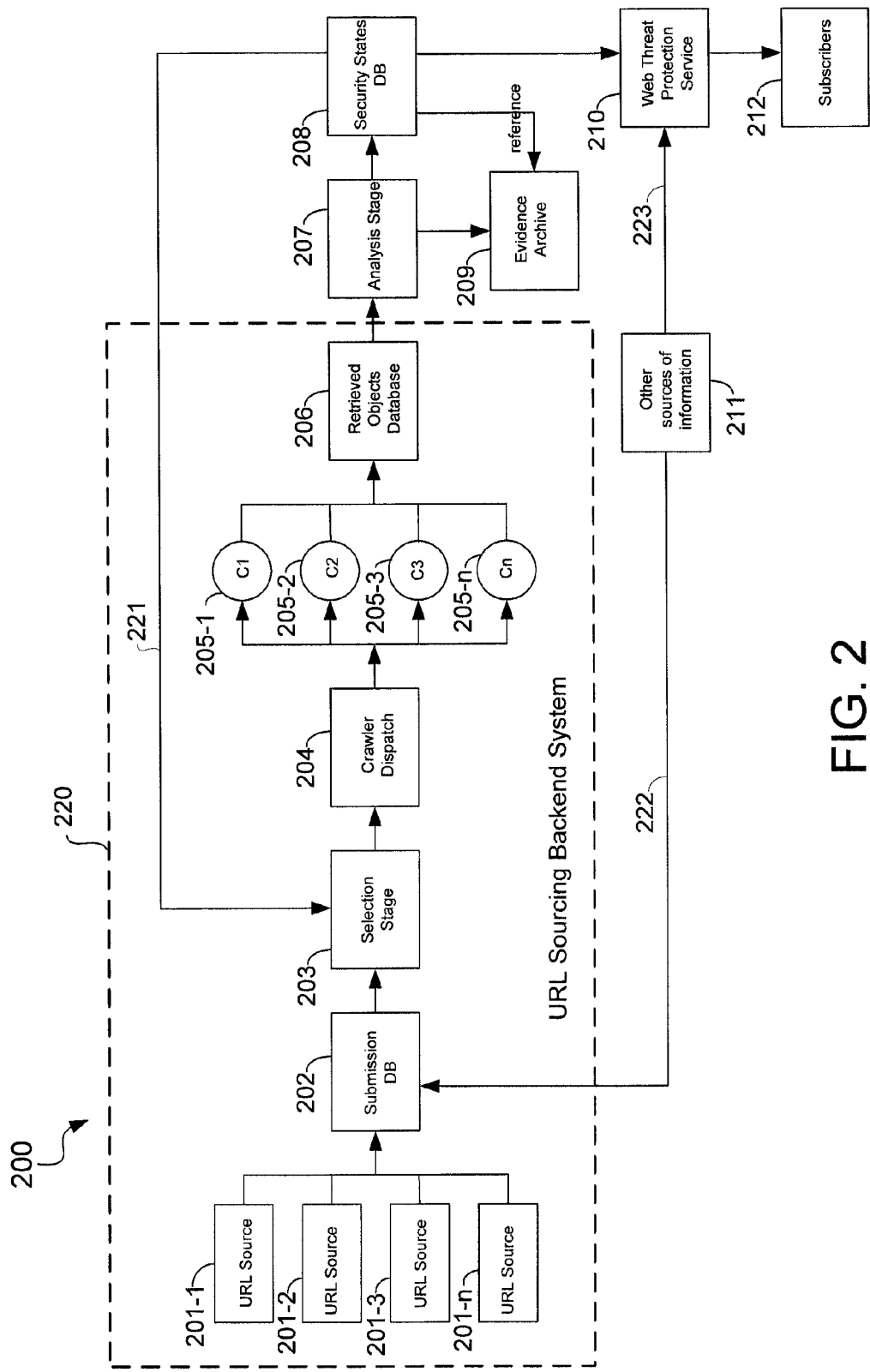
FIG. 2 shows a flow diagram schematically illustrating the operation of a web threat protection backbone system in accordance with an embodiment of the present invention.

FIG. 2 shows a flow diagram schematically illustrating the operation of the web threat protection backbone system 200 in accordance with an embodiment of the present invention. The components of the system 200 may be implemented using one or more computers. For example, the submission database 202 and the security states database 208 may comprise a commercially available database or listing running in a computer. Similarly, the crawlers 205 may comprise computer-readable program code running in a computer.

The system 200 provides backbone infrastructure for a web threat protection service 210. The web threat protection service 210 may maintain a security states database 208 or other listing containing security information of addresses of malicious locations on the Internet and malicious objects accessible over the Internet. The security states database 208 may include uniform resource locators (URLs) and domain names of websites on the Internet, with corresponding entry as to whether the website is a malicious or good website. Malicious websites are websites configured for malicious purposes, such as those that host downloadable software infected with a virus, are used to send spam, are configured as a phishing site, perform activities that are illegal or generally harmful to computers and their users, and host legitimate websites but have been compromised by a hacker attack. The malicious objects may include data, computer-readable program code, content, etc. configured for malicious purposes, such for performing illegal actions or actions that are generally harmful to computers and their users. Particular examples of malicious objects include downloadable software infected with a virus, malicious scripts, and iframe for redirects, for example.

Subscribers 212 may comprise computers that are authorized to access the web threat protection service 210 over the Internet. For example, a subscribing computer may request the web threat protection service 210 for security information of a particular URL. In response to the request, the web threat protection service 210 may query the security states database 208 and send the result to the subscribing computer. The result may indicate whether the URL belongs to a malicious or good website. As another example, a subscribing computer may query the web threat protection service 210 to get security information for an object, such as whether an object is malicious or not. Again, the web threat protection service 210 may query the database 208 for security information of the object and provide the result of the query to the subscribing computer. The web threat protection service 210 may be implemented in one or more server computers that have access to the database 208 and have software and hardware interfaces to communicate with subscribing computers 212 on the Internet.

Detecting malicious locations in a public computer network, such as malicious websites on the Internet, is very difficult because of the vastness of the network. The Internet interconnects computers from all over the world, so malicious websites could be everywhere. Worse, malicious websites may be setup or moved periodically, making it very difficult to detect and identify them for inclusion in a database of a web threat protection service.

In one embodiment, the web threat protection backbone system 200 includes a URL sourcing backend system 220. Instead of searching the entire Internet for malicious websites, the system 220 detects malicious websites from selected URL sources 201 (i.e., 201-1, 201-2, 201-3, ..., 201-n). The URL sources 201 may provice potentially malicious URLs to the URL sourcing backend system 220 for analysis and verification. Malicious URLs include those belonging to malicious websites, such as URLs of malicious web pages, viruses, malicious contents, spam, and other objects.

In one embodiment, the URL sources 201 may provide reactive URLs, proactive URLs, or both. Reactive URLs may include potentially malicious URLs that have already been collected by various systems, including, server logs, query logs, subscriber submissions, and the like. Unlike reactive URLs, proactive URLs are potentially malicious URLs that are obtained by active search efforts. Examples of proactive URLs include those obtained from honey pots and methodical searching on the Internet. Reactive and proactive URLs may be obtained manually (e.g., by an antivirus researcher), automatically (e.g., using a script), or combination of both.

Figure 3:
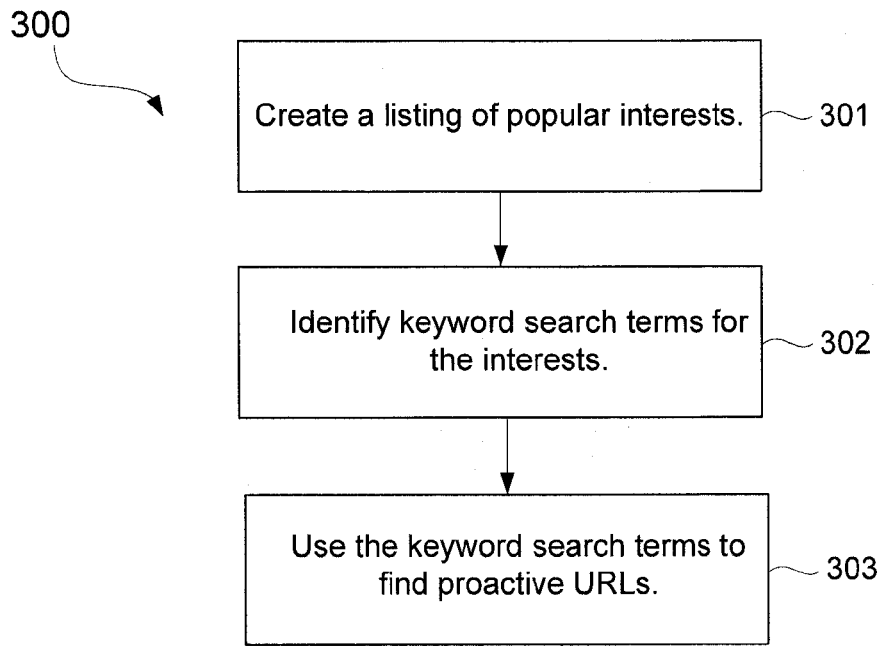
FIG. 3 shows a flow diagram of a method of obtaining proactive URLs in accordance with an embodiment of the present invention.

In the method 300 of FIG. 3, proactive URLs are obtained by creating a listing of popular interests (step 301), identifying keyword search terms for the popular interests (step 302), and using the keyword search terms to identify proactive URLs (step 303). The listing of popular interests may be based on cultural, social, political, religious, and industrial events, such as Independence Day in the United States, Golden Week in Japan, and Christmas Day. The listing of popular interests may also include currently popular celebrities (e.g., Britney Spears, Utada Hikaru), vacation locations, online topics (e.g., free downloads, online dating, pornography), and the like.

A keyword search term for a popular interest may be the name of the interest itself or something related to the interest. For example, using "Anime" as a popular interest, "anime," "Naruto," "Manga," etc. may be used as keyword search terms. The keyword search terms may then be used to identify related websites. For example, the keyword search terms may be used to query an Internet search engine, such as Google™, Yahoo!™, and MSN™. URLs from corresponding search results may be used as proactive URLs.

In one embodiment, proactive URLs are obtained by leveraging on web search data collected by popular Internet search engines. For example, proactive URLs may be obtained from web search results of popular queries. As a particular example, assuming "Britney Spears" is a popular search keyword, URLs from web search results using "Britney Spears" as a keyword may be harvested as proactive URLs. URLs from web pages of highly visited websites (e.g., by traffic ranking) may also be deemed as proactive URLs.

Figure 4:
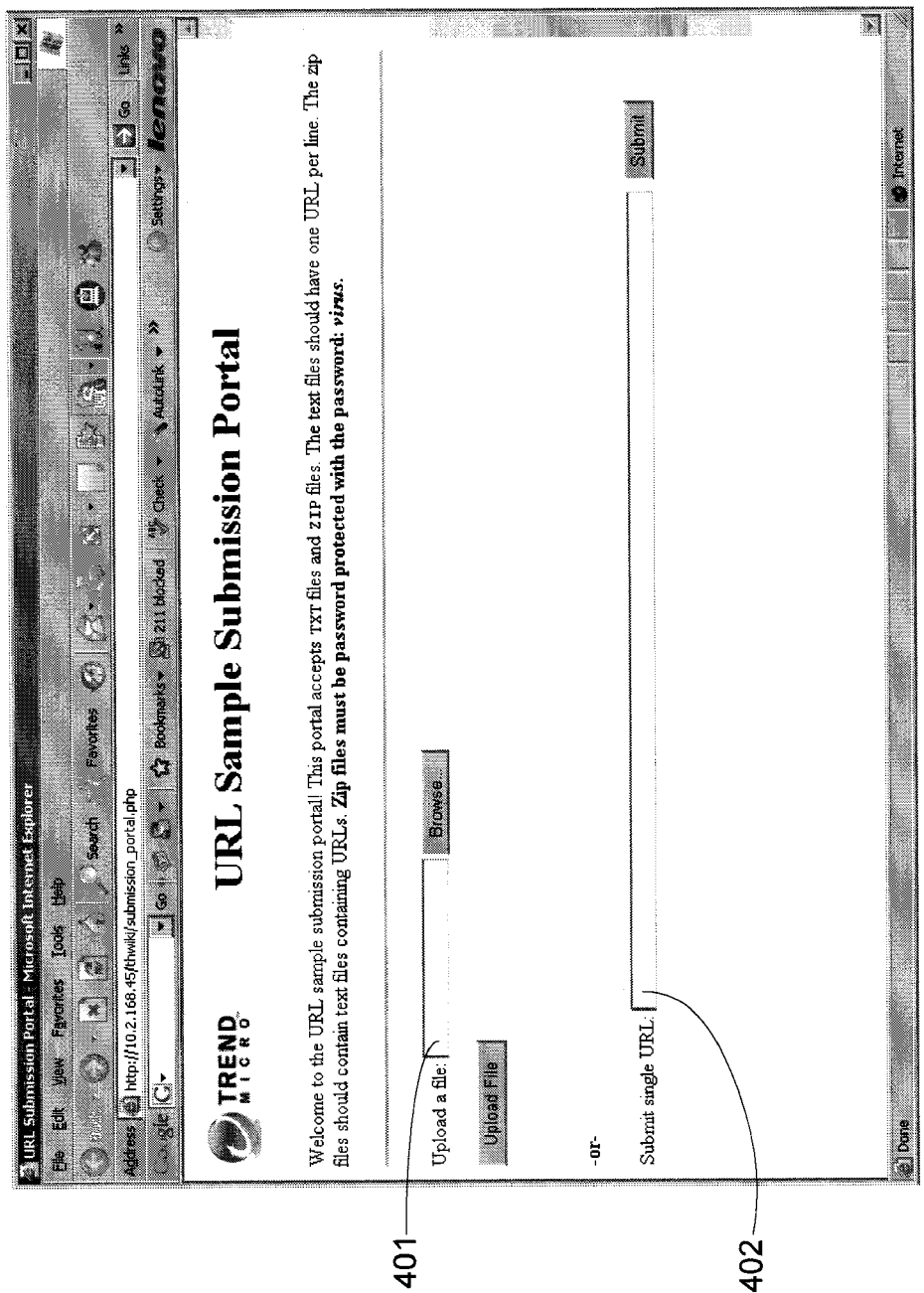
FIG. 4 shows an example web page for submitting URLs to a submission database in accordance with an embodiment of the present invention.

As shown in FIG. 2, proactive and reactive URLs from URL sources 201 may be collected in a submission database 202. As will be more apparent below, the proactive and reactive URLs serve as candidate URLs from which URLs will be selected for crawling. The submission database 202 may include a front end interface for receiving URLs manually or automatically. FIG. 4 shows an example web page for submitting URLs to the submission database 202 as a listing in a file (entry field 401) or individually (entry field 402). The example web page may be hosted in a website configured to receive URL submissions. A user in a private computer network may submit an individual URL to the submission database 202 to have that URL verified and included in a safe URL sphere (see FIG. 6) that may be used to navigate to good websites on the Internet.

Alternatively, proactive and reactive URLs may be submitted to the submission database 202 by email. For example, an email account may be configured to receive emails having an attached file that contains a listing of URLs. Computer-readable program code may be configured to extract an attached file from an email, extract URLs from the attached file, determine if extracted URLs are duplicates of previous submissions, and enter the non-duplicate ones to the submission database 202.

In the selection stage 203 of FIG. 2, URLs are selected from proactive and reactive URLs in the submission database 202. The selection stage 203 may select URLs based on the history of the websites where they are hosted and network traffic where they come from. For example, URLs hosted by known malicious websites may be selected at a higher priority compared to those of known legitimate websites. URLs submitted by particular subscribers may also be selected at higher priority.

In the crawler dispatch 204, crawlers 205 (i.e., 205-1, 205-2, 205-3, ..., 205-n) are configured to navigate to the URLs selected in the selection stage 203. The crawlers 205 retrieve objects and other information from the selected URLs. Generally speaking, objects are web page contents referred by the URLs. Examples of objects that may be retrieved by the crawlers 205 include web page HTML, scripts, binary files, flashes, images, etc. The objects retrieved by the crawlers 205 may be stored in an objects database 206 where the objects are organized and filed for retrieval in a subsequent analysis stage 207, where the objects are classified as being malicious or not. In one embodiment, the analysis stage 207 involves determining whether a script or binary file or other type of object retrieved by a crawler 205 is malicious, suspicious, or unknown. For example, a script or binary file may be scanned for viruses or observed for telltale signs of malicious activity.

In one embodiment, the results of the analysis stage 207 are stored in a security states database 208. The security states database 208 includes information as to whether an analyzed object is found malicious, good (i.e., not malicious), or unknown (i.e., not enough information). The security states database 208 may be organized in terms of the analyzed objects as well as the URLs of the objects and domains of the URLs. This results in the security database 208 containing security information about a URL, domain name, and/or object on the Internet. The web threat protection service 210 may access the security states database 208 to provide security information to subscribers 212. Some URLs in the security states database 208 may be reselected for crawling again (arrow 221) for rescanning purpose to check if their security information has changed, such as to check whether a malicious URL of a legitimate website is now good.

In one embodiment, data and other information used in the analysis stage 207 to detect for malicious URLs, domains, and objects are stored in an evidence archive 209, which may be in a file server or storage computer. The evidence archive 209 advantageously provides proof in the event the owner or operator of a website with a URL that has been deemed malicious complains or takes legal action against the operator or owner of the web threat protection service 210. Entries in the security states database 208 may include references to the evidence archive 209 for efficient retrieval of evidence in the event proof is needed as to why a URL, domain name, or object is designated as malicious.

The web threat protection backbone system 200 may also leverage other sources of information (see 211) to receive candidate proactive and reactive URLs (arrow 222) and to obtain security information (arrow 223). The security information may indicate whether a URL, domain name, or object on the Internet is malicious or not, for example.

Figure 5:
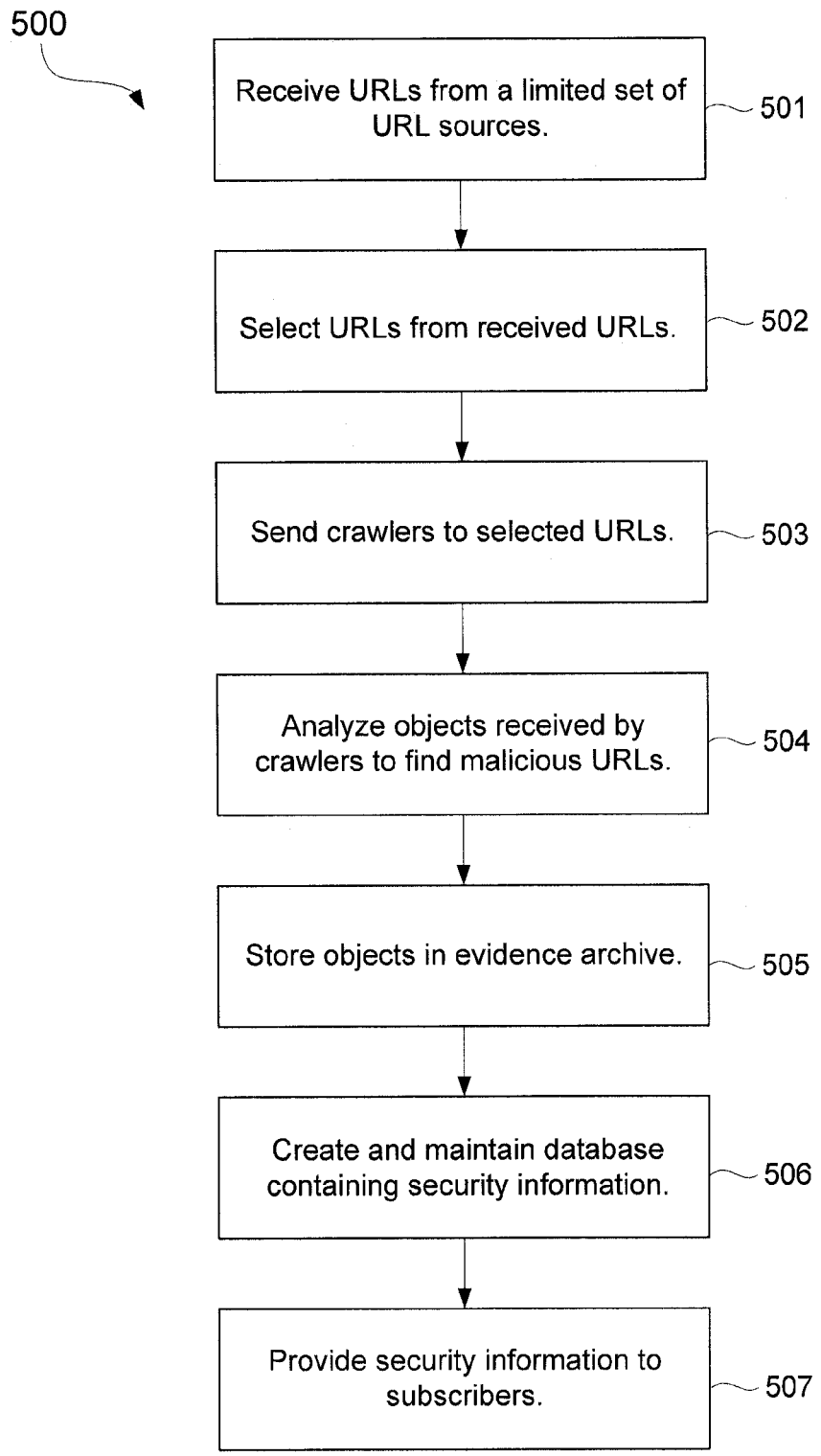
FIG. 5 shows a method of discovering malicious locations in a public computer network in accordance with an embodiment of the present invention.

Referring now to FIG. 5, there is shown a method of discovering malicious locations in a public computer network in accordance with an embodiment of the present invention. The method 500 may be performed by the web threat protection backbone system 200.

The method 50 may begin by receiving URLs from a limited set of URL sources (step 501). The limited set of URL sources may include sources of reactive and proactive URLs. URLs may be selected from the received URLs (step 502). Crawlers may be dispatched to the selected URLs to retrieve objects and other information indicative of whether the selected URLs are malicious or not (step 503). Objects retrieved by the crawlers are analyzed to determine if the objects are malicious (step 504). URLs of malicious objects are deemed malicious URLs, while URLs of good objects are deemed good URLs. URLs of objects that have insufficient information to determine whether they are malicious or good are deemed unknown. Malicious objects and associated information are stored in an evidence archive to serve as proofs in the event someone challenges a reputation determination for an object that has been deemed malicious (step 505). A database containing security information, such as whether a URL is malicious or not, is created and maintained based on analysis of corresponding objects (step 506). The database of security information may be used to provide web threat protection service to subscribers (step 507).

Figure 6:
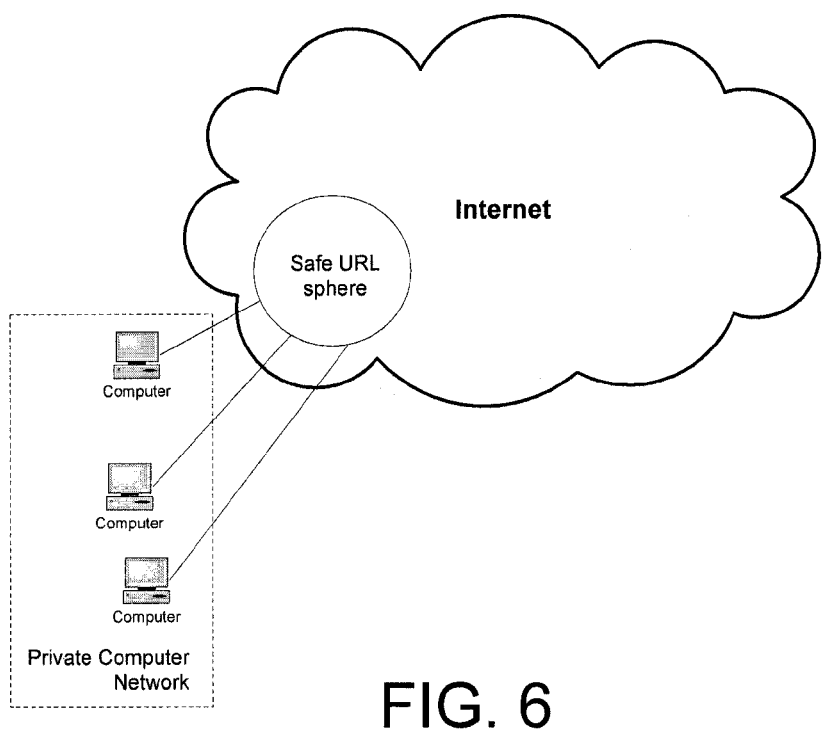
FIG. 6 schematically illustrates the use of a safe URL sphere in a private computer network in accordance with an embodiment of the present invention.

In one embodiment, a safe URL sphere is created from URLs that have been analyzed as good. That is, the safe URL sphere comprises a set of URLs that are safe to navigate. This is schematically illustrated in FIG. 6, where computers can safely navigate to URLs included in the safe URL sphere. The URLs included in the safe URL sphere may include those URLs that are deemed good using the web threat protection backbone system 200, for example. As can be appreciated, the limited number of URLs in the safe URL sphere, as compared to the Internet in general, provides a more manageable number of URLs that can be evaluated and periodically verified. For example, the URLs frequented by particular subscribers may be submitted to the submission database 202 (see FIG. 2) for analysis, with URLs deemed to be good being included in the safe URL sphere. The safe URL sphere is particularly useful with private computer networks, where the safe URL sphere can be tailored to the navigation history and preferences of users. A private computer network may institute a policy where users are only authorized to navigate to URLs in the safe URL sphere, or where users are advised to navigate only to URLs in the safe URL sphere and proceed with caution when navigating outside the safe URL sphere. The safe URL sphere may be implemented in an Internet gateway, for example. A user may submit a URL not included in the URL sphere to the submission database 202 to have that URL verified and then included in the safe URL sphere as appropriate.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of discovering malicious locations in a public computer network, the method to be performed by a computer system and comprising:

sending a query to an Internet search engine;

receiving search results responsive to the query from the Internet search engine;

obtaining a set of uniform resource locators (URLs) from the search results received from the Internet search engine;

sending crawlers to retrieve objects from the set of URLs;

analyzing objects retrieved by the crawlers to identify malicious objects;

identifying malicious URLs from the set of URLs based on the analysis of objects retrieved by the crawlers;

creating a safe URL sphere comprising URLs identified to be good URLs based on the analysis of the objects retrieved by the crawlers; and limiting navigation of computers within a private computer network to good URLs included in the safe URL sphere.

2. The method of claim 1 further comprising:

storing information about the identified malicious objects in an evidence archive to serve as proofs as to why the identified malicious URLs are designated as malicious.

3. The method of claim 1 wherein the identified malicious objects comprise computer viruses.

4. A system for discovering malicious locations on a public computer network, the system comprising:

a first computer system receiving candidate uniform resource locators (URLs) obtained from search results of an Internet search engine and running a plurality of crawlers configured to retrieve objects from URLs selected from the candidate URLs;

a second computer system running a security states database configured to store results of analysis of the objects retrieved by the crawlers, the results of the analysis indicating whether a URL from which an object was retrieved is malicious or good; and an Internet gateway comprising a safe URL sphere comprising URLs identified to be good based on the results of the analysis, the Internet gateway limiting navigation of computers within a private computer network to good URLs identified in the safe URL sphere.

5. The system of claim 4 further comprising a file server having an evidence archive configured to store objects from malicious URLs for use as proof as to why a URL has been designated as malicious.

6. A method of discovering malicious locations in a public computer network, the method to be performed by a computer system and comprising:

sending a query to an Internet search engine;

receiving search results responsive to the query from the Internet search engine;

obtaining uniform resource locators (URLs) from the search results received from the Internet search engine;

retrieving objects from at least a portion of the URLs obtained from the search results received from the Internet search engine, wherein the retrieved objects are retrieved by crawlers dispatched to the portion of the URLs;

analyzing the retrieved objects to find corresponding malicious and non-malicious URLs;

creating a safe URL sphere comprising non-malicious URLs identified by analyzing the retrieved objects; and limiting navigation of computers in a private computer network to URLs identified to be good in the safe URL.

* * * * *